United States Patent
Faibish et al.

(10) Patent No.: US 7,930,487 B1
(45) Date of Patent: Apr. 19, 2011

(54) SYSTEM AND METHOD FOR PROVIDING ACCESS CONTROL TO RAW SHARED DEVICES

(75) Inventors: Sorin Faibish, Newton, MA (US); Per Brashers, Oakland, CA (US); Jason Glasgow, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 688 days.

(21) Appl. No.: 11/854,616

(22) Filed: Sep. 13, 2007

(51) Int. Cl.
*G06F 12/00* (2006.01)
(52) U.S. Cl. ........................ 711/147; 711/113
(58) Field of Classification Search ................... 711/147, 711/113
See application file for complete search history.

(56) References Cited

U.S. PATENT DOCUMENTS

| | | | |
|---|---|---|---|
| 6,260,120 B1* | 7/2001 | Blumenau et al. | 711/152 |
| 6,816,891 B1* | 11/2004 | Vahalia et al. | 709/214 |
| 2003/0101200 A1* | 5/2003 | Koyama et al. | 707/200 |
| 2003/0200197 A1* | 10/2003 | Long et al. | 707/1 |
| 2006/0253669 A1* | 11/2006 | Lobdell | 711/162 |
| 2007/0057048 A1* | 3/2007 | Plotkin et al. | 235/382 |
| 2007/0233957 A1* | 10/2007 | Lev-Ran et al. | 711/118 |

\* cited by examiner

*Primary Examiner* — Hashem Farrokh
(74) *Attorney, Agent, or Firm* — Krishnendu Gupta; Joseph D'Angelo

(57) ABSTRACT

An access control agent is advantageously deployed at a host device to prevent malicious use of a storage system by unauthorized hosts and users. In one embodiment the access control agent is disposed in a processing path between the application and the storage device. An application is mounted as an image file by a loop device to provide a virtual file system. The virtual file system is populated with access control information for each block of the file. Application I/O requests are mapped to physical blocks of the storage by the loop device, and the access control information is used to filter the access requests to preclude unauthorized requests from being forwarded to the storage client (and consequently the storage devices). With such an arrangement, access rights can be determined at I/O accesses, file and block granularity for each user.

19 Claims, 5 Drawing Sheets

SYSTEM AND METHOD FOR PROVIDING ACCESS CONTROL TO RAW SHARED DEVICES

FIELD OF THE INVENTION

This invention relates generally to the field of storage and more particularly to a method of controlling host access to raw storage devices.

BACKGROUND OF THE INVENTION

Storage area networks (SAN) connect a pool of storage devices to one or more host devices via a communication infrastructure such as Fibre Channel, Small Computer Systems Interface (SCSI), or Internet SCSI (iSCSI). In many storage systems, accesses by the host to the storage pool are controlled by a file server. The file server may include authentication and authorization mechanisms to protect the storage against malicious host accesses.

One problem with using file servers to control delivery of data to hosts is that it reduces the performance of host applications that require frequent I/O or large block transfers. Thus there has arisen a need to allow hosts to directly access the block storage devices, with minimal file server intervention. One method of delegating data access to the storage array to hosts is described in patent application Ser. No. 11/394,768 entitled "A Method for Providing Access to Shared Storage and Shared Storage Services in Grids and Clusters with Very Large Numbers of Nodes" filed on, filed Mar. 31, 2006 and incorporated herein by reference. In the disclosed system, hosts retrieve logical to physical file mapping information associated with their files from a file system via the file server. The file mapping information is used by the host to perform direct accesses of the raw disks devices.

One problem with permitting direct host access to raw devices is that storage arrays generally include only limited protection mechanisms and as a result the potential for malicious data access is increased. For example, SCSI storage devices are identified using Logical Unit Numbers (LUNs). Host accesses to particular LUNs may be controlled through appropriate setting of bits in a LUN mask. LUN access is typically controlled by registering the authorized hosts with each LUN using a World Wide Name (WWN) of host, uniquely generated by its associated Host Bus Adaptor (HBA) or a host initiator.

Another problem with the LUN mask approach is that it lacks the ability to protect the data with any granularity; any user at an authorized host to may gain access to all data of the LUN if the mask bit for the host is set, whether the particular user is authorized to access the data or not.

Yet another problem with relying on LUN masking to secure data arises as a result of the evolution of the data center. LUN masks have been effective in the traditional data center storage environment because a single host generally supported a single application (such as a database or simulation engine) and there was a one-to-one mapping between applications and LUNs. In such an environment, the application-level access control policies could easily be mapped to host-level policies, and user access control could be provided at the application level.

However the growing need for increased storage and disaster recovery capabilities has changed the concept of what constitutes a 'data center' from a co-located host and storage device arrangement to a geographically distributed Internet accessible storage grid. In grid storage architectures multiple applications may be mapped across multiple servers and often multiple applications may be mapped to a single server. The concepts of Virtual LUNs are introduced to provide seamless movement of data within the grid. With the advent of Virtual LUNs, the one-to-one mapping of application to server breaks down and it is no longer possible to map application level access control policies to host level access control policies.

In addition, because the data center is Internet accessible, the WWN/LUN masking security construct is especially vulnerable to hackers. In traditional co-located host/storage environment there was very little need for access control and security mechanisms within a data center because the host was a trusted, known entity. However, with the advent of iSCSI, host initiators can gain access to data storage arrays remotely via the Internet, from outside the data center. The potential for hacking of data storage is increased as the WWN was replaced by an initiator name for iSCSI initiators and may easily be hacked, allowing malicious users to gain access to the storage.

It would be desirable to identify a mechanism for protecting distributed shared storage arrays from malicious access while still allowing direct access to the storage arrays by hosts.

SUMMARY OF THE INVENTION

According to one aspect of the invention, a method of securing access to shared storage by a plurality of hosts includes the steps of detecting an access request from a user, the access request being associated with at least one block of the shared storage and the user being associated with an application executing at a host, retrieving access control information associated with the block from a coupled access control source and responsive to the access control information indicating that the user is authorized to perform the requested access to data blocks, forwarding the access request to the shared storage for servicing.

With such an arrangement the performance advantages associated with allowing hosts to access raw storage devices may be realized while ensuring that the data access is secured against malicious access.

DETAILED DESCRIPTION

According to one aspect of the invention an access control agent is advantageously deployed at a host device to prevent malicious use of a storage system by unauthorized hosts and users. In one embodiment the access control agent is disposed in a processing path between the application and the storage device. An application is mounted as an image file by a loop device to provide a virtual file system. The virtual file system is populated with access control information for each block of the file. Application I/O requests are mapped to physical blocks of the storage by the loop device, and the access control information is used to filter the access requests to preclude unauthorized requests from being forwarded to the storage client (and consequently the storage devices). With such an arrangement, access rights can be determined at I/O accesses, file and block granularity for each user. Together the access control agent and a file server may be used to provide a single access control management point, where block and file storage share a single model for provisioning, configuration and data mobility.

Figure 1:
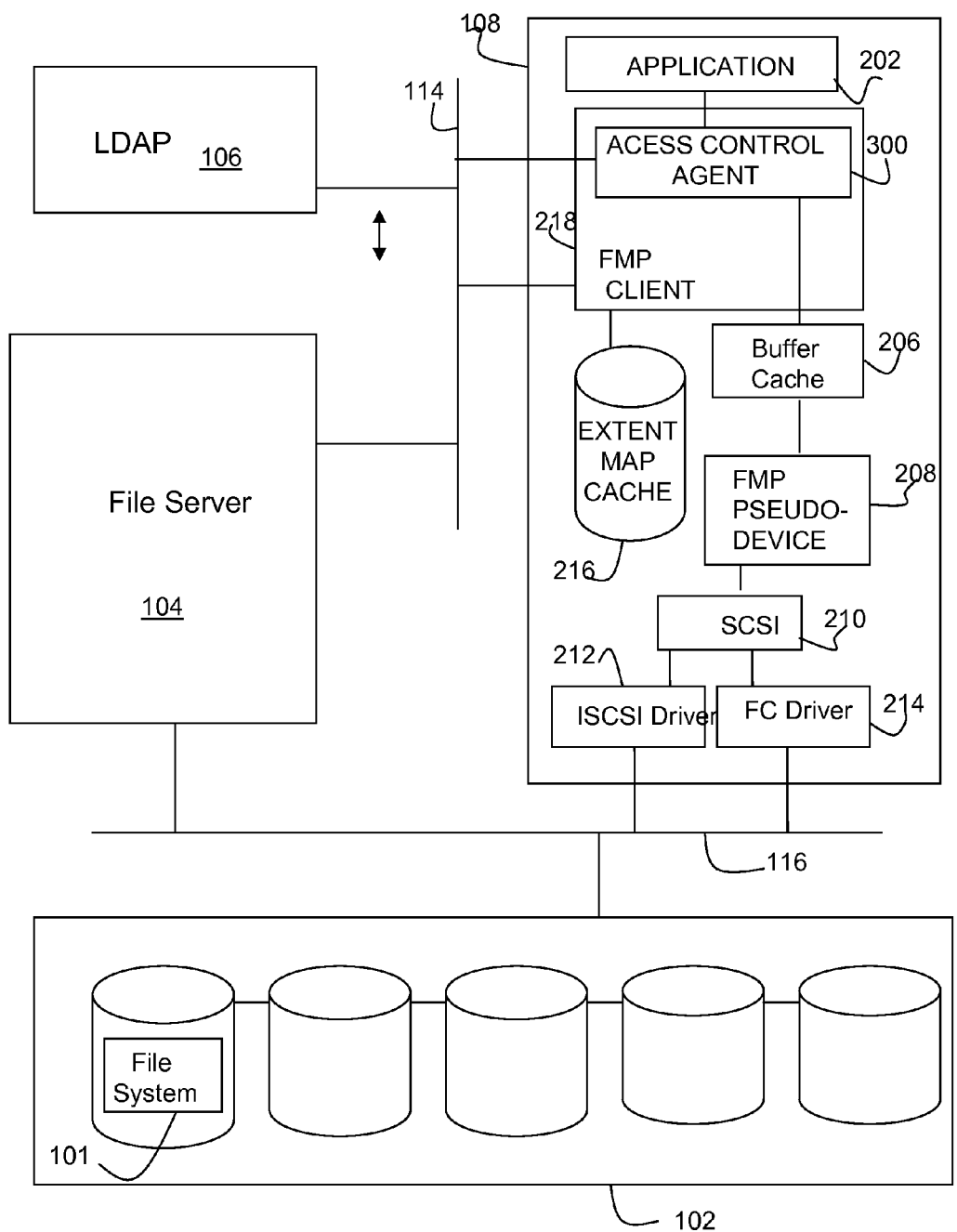
FIG. 1 is a block diagram of a storage environment in which the present invention may advantageously be used.

Referring now to FIG. 1, a system 100 is shown to include an access control agent 300 of the present invention. The system 100 includes a File Server 104 and a host device 108, both of which are coupled to a disk array 102 via a Storage Area Network (116). The SAN 116 may be a FC SAN, an IP SAN, or may implement IP over a fiber channel or SCSI physical interface. The file server 104 is a computer on which a user can map or mount a disk drive or directory so that the directory appears to be on the machine at which the user is sitting. In one embodiment, the file server may be a file mapping protocol (FMP) server such as that described in the above references patent application Ser. No. 11/394,768. An FMP server provides a centralized tracking service for tracking allocations of storage blocks to files and for mapping virtual addresses to physical addresses of the block disk devices. An FMP client 218 at the host device 108 stores logical to physical mapping information in an extent map cache 216. The physical mapping information is used by the FMP pseudo-device to directly access raw blocks of data in the storage array 102 using the various disk interfaces 210, 212 and 214.

According to one aspect of the invention, an access control agent 300 is provided as part of the FMP client 218. The access control agent 300 filters user requests for application data to ensure that the user has the appropriate authorization for the type of access requested. The access request is not forwarded to the storage until the user's access has been authorized. As a result resources within and external to the host may be protected from unauthorized access.

The access control agent includes a loop device driver which is used to mount the application image as a virtual file system. The loop device translates application I/O accesses into physical block addresses of the block storage devices. In one embodiment the virtual file system stores only access associated meta-data for each file or block of the application, though the present invention is not limited to the storage of any particular information in the virtual file system. It is appreciated that the concepts of the present invention may be extended to include the storage of other types of meta-data depending upon the particular needs of a storage environment. The virtual file system data structure is populated during operation as I/O accesses are made by the users of the application 202.

File servers generally offer some form of system security to limit access to files to specific users or groups. For example, file systems (such as file system 101) may store access control lists which governs the access permissions afforded to users for directories, files and blocks of the file system. In large organizations, this is a task usually delegated to what is known as directory services such as LDAP server 106. The LDAP servers work within the hierarchical computing environment which treat users, directories, computers, applications and files as distinct but related entities on the network and grant access based on user or group credentials. In many cases, the directory service spans many file servers, potentially hundreds for large organizations.

In the present invention, the access control information used by the access control agent may be populated by using information from an access control source, where the source may be the local file system 101, a directory service such as LDAP server 106, or any combination of the two. The present invention is not limited to any particular access control source for populating the virtual file system data structure.

Figure 2:
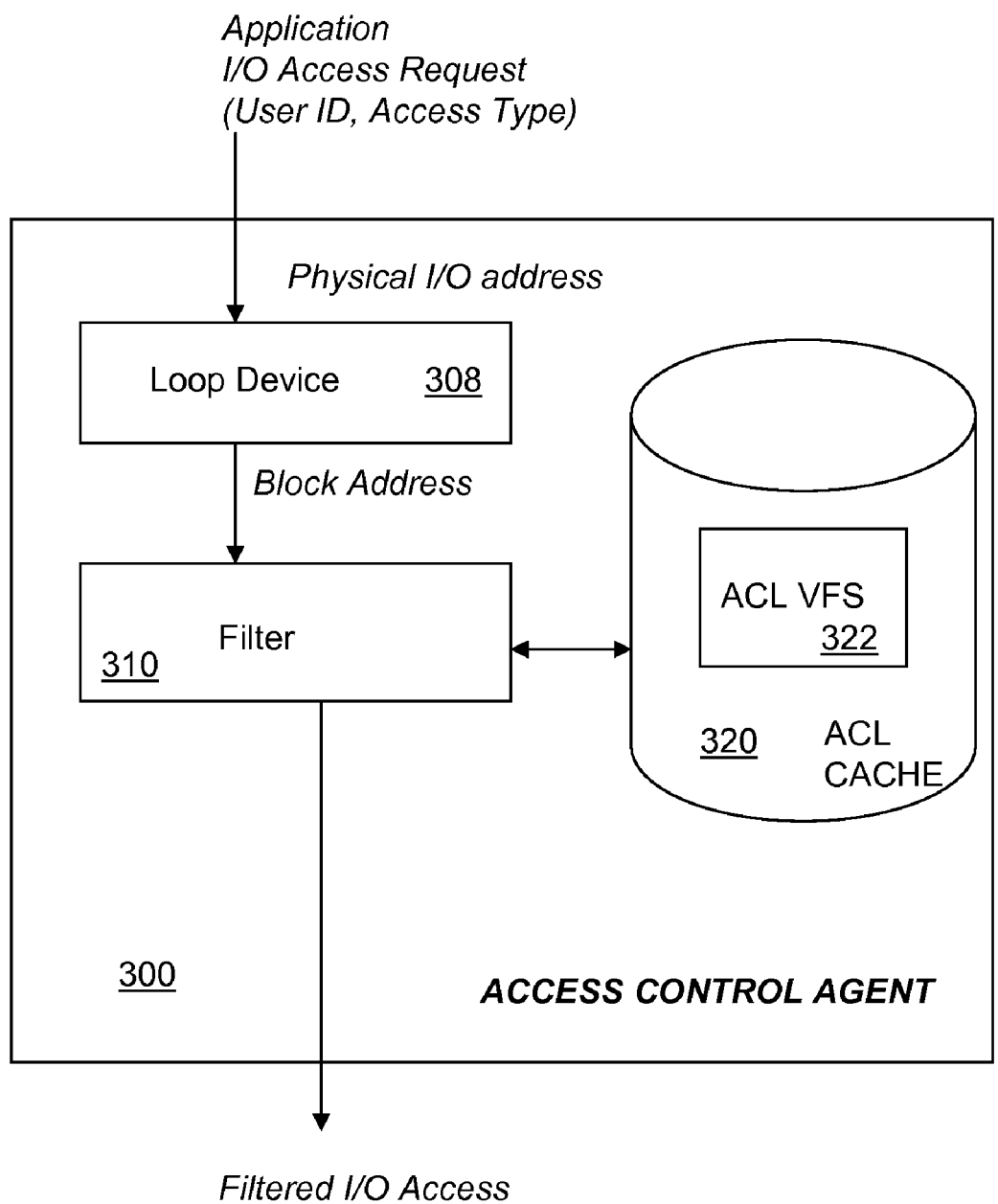
FIG. 2 is a diagram illustrating exemplary components of an access control agent of the present invention.

FIG. 2 illustrates several components that may advantageously be included in an access control agent of the present invention. The agent 300 includes a loop device 308, filter 310 and an Access Control List cache 320. The loop device 308 is a device driver that allows an image file to be mounted as though it were a normal block device. I/O access requests received from the application are translated to physical block addresses of the raw storage. In one embodiment, if the I/O requests are received as Virtual LUN accesses, the File Mapping Protocol processes described in the above referenced patent application may be used to retrieve the corresponding physical address of the I/O request. The physical addresses can be used to access any database that stores access control information for the block, including a file system in a coupled file server (101, FIG. 1), an LDAP server (106, FIG. 1) or a local ACL cache 320. In a preferred embodiment, the ACL cache stores access control information in an ACL virtual file system (ACL VFS) 322 for each file system accessed by the host, where the ACL information includes information previously retrieved from the LDAP 106 or file server 101.

As I/O requests are received from the application, the filter 310 compares information included in the access request (including information such as the file system identifier, user identifier, block number, logical file number, etc.) against access control information that is stored in the cache 320 (if available). In the event that no access control information is in the cache, either the file server or directory service is accessed to retrieve the access control information. Depending upon the file system protocol, each file and each block within the file may have associated therewith an access control list which controls the particular permissions associated with users and application data. If the user that sourced the I/O access has the permission to perform the particular access type for the accessed data, then the request is forwarded to a buffer cache 206 for eventual transfer to block storage device.

The buffer cache 206 stores a local copy of portions of the file system that are frequently accessed by the application. Data that is read from raw block storage device is stored in the buffer cache, and subsequent reads to the same location therefore do not incur the delays associated with accessing the raw storage. Data that is to be written to storage is temporarily stored in the buffer cache, with subsequent writes to the same location overwriting the data. As a result, the number of write operations that are forwarded to raw storage can be minimized. When the buffer cache becomes full it is necessary to 'commit' the data to raw storage to free up space in the buffer cache. According to one aspect of the invention, the access control agent 300 may also be used to check that block access has not been modified between access time and buffer cache commit for the block.

Figure 3:
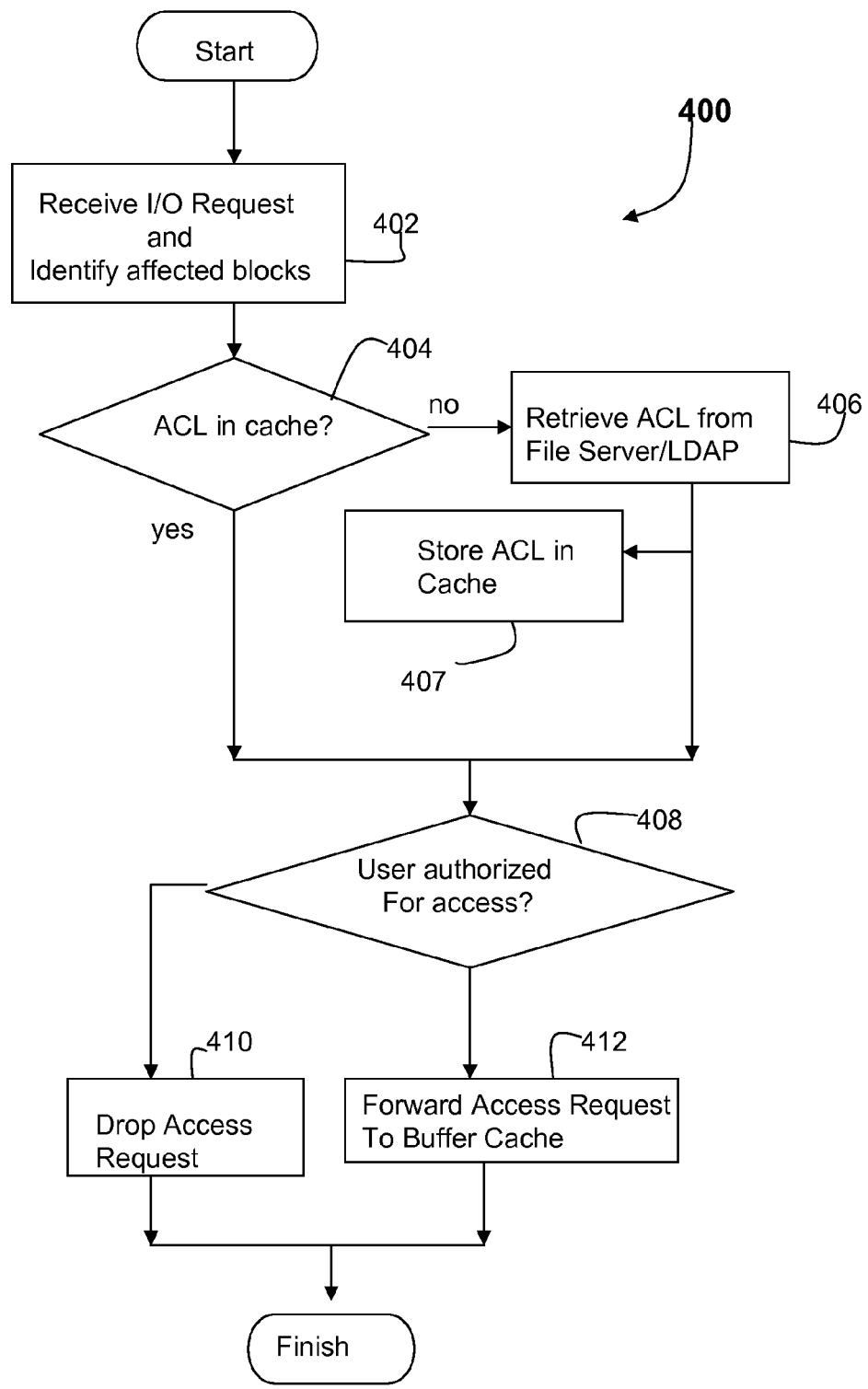
FIG. 3 is a flow diagram illustrating exemplary steps that may be performed by the access control agent of FIG. 2 to filter host accesses to raw storage.

For example, referring now to FIGS. 3 and 4, several processes that may be performed by the access control agent will now be described. FIG. 3 illustrates a process 400 performed by the agent 300 in response to an application data I/O request. At step 402 an I/O access request is received and translated into a block access request by the loop device. At step 404 it is determined whether ACL for the block is stored locally in the ACL cache. If the access information for the block(s) is not stored in the cache, then at steps 406 and 407 the ACL information is retrieved from the file server/LDAP and stored in the cache.

Once access information for the block is retrieved, at step 408 it is compared against the access type and user information associated with the access to determine if the user has permission for the requested access. If the user has the permission for the access then at step 412 the request is forwarded to the buffer cache/raw storage. Read requests will be either serviced from the buffer cache or, if read data is not in the buffer cache, the read request will be forwarded to raw storage. Write requests will be stored in the buffer cache. If the user does not have the required access permissions for the data then at step 410 the access is dropped.

Figure 4:
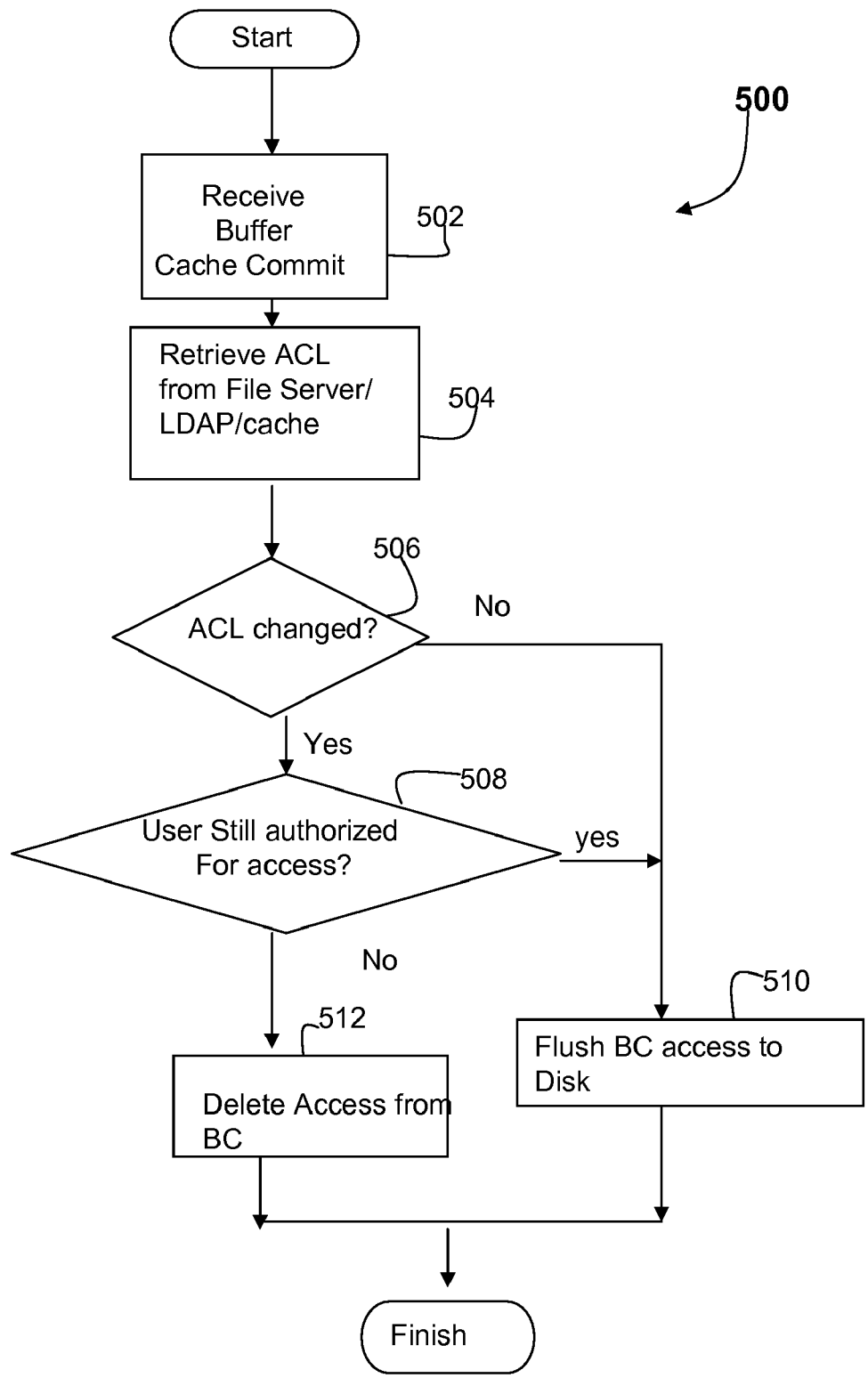
FIG. 4 is a flow diagram of exemplary steps that may be performed by the access control agent of FIG. 2 to validate access prior to flushing of a buffer cache to storage.

FIG. 4 illustrates a process that may be performed to validate access permissions prior to committing contents of the buffer cache to raw block storage device. At step 502 the access control agent 300 receives a physical address of a raw storage block that is in the buffer cache and ready to be committed to raw storage. At step 504, the 'current' access control associated with the block or file that is to be committed is retrieved from the file system or LDAP, since the ACL cache information may have become stale prior to buffer cache commit. At step 506, the current access control is compared against the access control stored in the cache. If there has been no change to the access control, then at step 510 the block or file is flushed to raw storage.

In one embodiment, when the data is forwarded to the buffer cache, the source (or host user) of the raw storage access is also saved as part of the buffer cache entry. If it is determined at step 506 that the access control for the block/file has changed, then at step 508 the current ACL is compared against the access type and user of the buffer cache entry that is to be committed. If the current ACL indicates that the user still authorized to access the file/block, then the block is flushed to the raw storage. If the user is no longer authorized for such an access then at step 512 the block/file is deleted from the buffer cache and no access is made to storage.

Accordingly an access control agent has been described which may perform intelligent filtering of raw storage accesses at an I/O, file and block granularity. The access control agent allows application data control mechanisms to be effectively applied prior to the initiation of storage accesses. The access control agent, LDAP and file server together provide a centralized management point for user authentication, enabling malicious accesses to be pre-empted before any damage can be done to the storage devices.

It should be appreciated that the concepts of the present invention may be used to pre-empt malicious accesses to protect any of the storage resources. For example, while the above discussion has described the use of the agent 300 within a FMP environment for protecting raw disk devices, concepts of the present invention may easily be extended into an NFS server environment to protect NFS file server resources.

Figure 5:
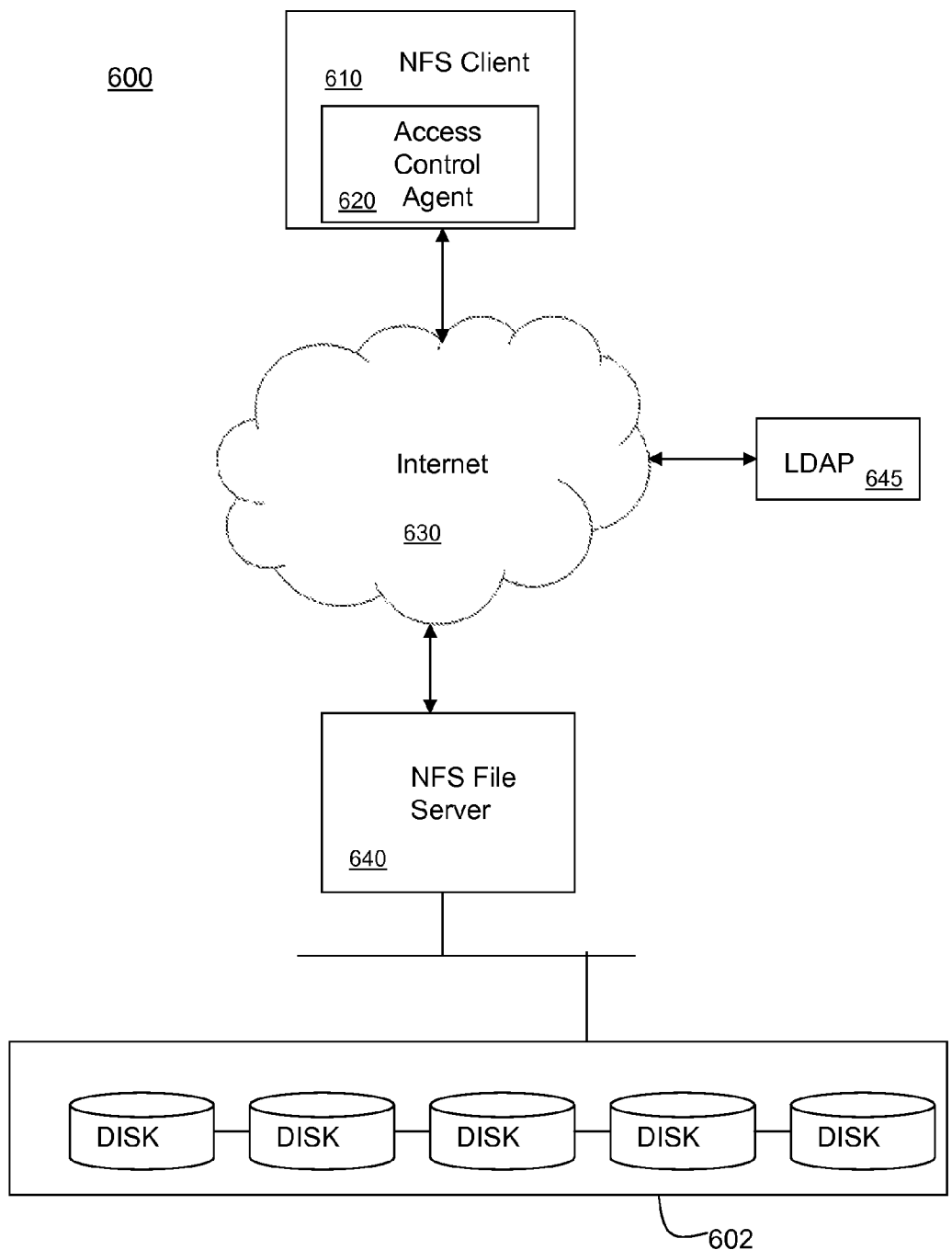
FIG. 5 is a block diagram of a Network File System which advantageously uses the access control agent of the present invention to reduce NFS traffic to the file server.

Such an embodiment of the invention is shown in FIG. 5. A Networked File System 600 is shown to include a NFS client 610 coupled to a NFS server 640 via the Internet 630. The client 610 retrieves data from storage 602 by issuing requests to the server 640. An access control agent 620 (similar to agent 300 of FIG. 2) is disposed at client 610 to filter the application data access prior to forwarding to the server 640. Similar to the embodiment described with regards to FIGS. 2 and 3, the access control agent may receive access information from the file server 640 or LDAP 645 and use the access control information to control the flow of requests issued to the server 640, to reduce unnecessary traffic and utilization of server resources for unauthorized accesses.

Accordingly a system and method for controlling user access to shared storage resources has been shown and described. Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method of securing access to shared storage by a plurality of hosts includes the steps of:
   detecting an access request from a user, the access request being associated with at least one block of the shared storage and the user being associated with a host; wherein there is an access control source running on the host and wherein the access control source is communicatively coupled to a buffer cache; wherein the buffer cache is located on the host;
   monitoring the buffer cache, wherein the buffer cache is disposed between the user and the shared storage, to identify a block to be committed to storage, the block to be committed being associated with a buffered user and a buffered access type;
   retrieving access control information associated with the block from the coupled access control source; and
   responsive to the access control information indicating that the user is authorized to perform the requested access on the block, forwarding the access request to the shared storage for servicing and storing the access request in the buffer cache.

2. The method of claim 1 wherein the access control source is a file system on a coupled file server.

3. The host device of claim 2 wherein the block corresponds to a logical to physical map of information stored on the shared storage.

4. The method of claim 1 wherein the access control source is a directory service coupled to the host.

5. The method of claim 1 further including the step of responsive to the access control information indicating that the user is not authorized to perform the requested access on the block, dropping the access request.

6. The method of claim 1 further including the step of storing the access control information in a cache.

7. The method of claim 6 further including the steps of:
   accessing the cache to locate previously stored access control information for the block prior to retrieving the access control information from the coupled file server; and
   using the previously stored access control information to determine whether the user is authorized to perform the requested access on the block.

8. The method of claim 1 wherein the shared storage comprises a plurality of data nodes coupled via a Storage Area Network (SAN).

9. The method of claim 1 wherein the user accesses the shared storage via requests to a file server.

10. The method of claim 1, further including the steps of, for an application executing at each host:
    executing, on the host, a loop device driver to map an image file of the application to a file system comprised of a plurality of blocks; and
    for each access by each user, mapping a physical address of the access to a block address of the file system.

11. The method of claim 1 wherein the block corresponds to a logical to physical map of information stored on the shared storage.

12. A host device coupled to a plurality of shared storage devices, the host device including:
    a processing device;
    an access control agent, on the host, communicatively coupled to a buffer cache, the access control agent comprising:
        a loop device, on the host, for mapping accesses associated with a user of an application to physical blocks of a coupled storage system; and
        a filter, for comparing access control information for each block against an access type and user identifier of each access to determine whether a user associated with the user identifier is authorized for an access of the access type, and for selectively forwarding the access to the coupled storage system; wherein each block corresponds to a logical to physical map of information stored on the shared storage
    the buffer cache, on the host, monitored for temporary storage of accesses destined for the coupled storage device, wherein the access control agent is used to validate accesses to the coupled storage that result from the commitment of a block of the buffer cache to storage; wherein the buffer cache is disposed between the user and the shared storage, is used to further identify a block to be committed to storage, the block to be committed being associated with a buffered user and a buffered access type.

13. The host device of claim 12 wherein the access control information is retrieved from an access control source comprising at least one of a file system and a directory service.

14. The host device of claim 12, wherein the host is coupled to the coupled storage via a Storage Attached Network and wherein the host accesses raw disks of the coupled storage.

15. The host device of claim 12, wherein the host is coupled to the coupled storage via a Network File System (NFS) server.

16. A program product for securing access to shared storage by a plurality of hosts the program product comprising:
    a computer-readable storage medium encoded with computer-executable program code enabling:
        detecting an access request from a user, the access request being associated with at least one block of the shared storage and the user being associated with a host; wherein there is an access control source running on the host and wherein the access control source is communicatively coupled to a buffer cache; wherein the buffer cache is located on the host;
        monitoring the buffer cache, wherein the buffer cache is disposed between the user and the shared storage, to identify a block to be committed to storage, the block to be committed being associated with a buffered user and a buffered access type;
        retrieving an access control information associated with a block from the coupled access control source; and
        responsive to the access control information indicating that the user is authorized to perform the requested access on the block, forwarding the access request to the shared storage for servicing and storing the access request in the buffer cache.

17. The computer program product of claim 16 wherein the block corresponds to a logical to physical map of information stored on the shared storage.

18. The computer program product claim 16, further enabling, for an application executing at each host:
    executing, on the host, a loop device driver to map an image file of the application to a file system comprised of a plurality of blocks; and
    for each access by each user, mapping a physical address of the access to a block address of the file system.

19. The computer program product of claim 16, further enabling:

accessing the cache to locate previously stored access control information for the block prior to retrieving the access control information from the coupled file server; and using the previously stored access control information to determine whether the user is authorized to perform the requested access on the block.

* * * * *